United States Patent

Scharfen et al.

[15] 3,682,492

[45] Aug. 8, 1972

[54] CHUCK FOR MACHINE TOOLS

[72] Inventors: Hans Scharfen, Buderich; Wolfgang Feustel, Dusseldorf-Garath, both of Germany

[73] Assignee: Paul Forkardt Kommanditgesellschaft, Dusseldorf, Germany

[22] Filed: June 17, 1970

[21] Appl. No.: 46,994

[30] Foreign Application Priority Data

June 18, 1969 Germany..........P 19 30 870.4

[52] U.S. Cl. .................................................279/5
[51] Int. Cl. ............................................B23b 31/34
[58] Field of Search...........................................279/5

[56] References Cited

UNITED STATES PATENTS 2,972,487   2/1961   Blackburn.....................279/5

FOREIGN PATENTS OR APPLICATIONS 618,240   2/1961   Italy.............................279/5

*Primary Examiner*—Francis S. Husar
*Attorney*—Walter Becker

[57] ABSTRACT

The specification discloses a chuck having work axis on which the body is rotatable. The chuck has opposed workpiece engaging jaws therein rotatable about a common axis perpendicular to and intersecting the workpiece axis. One of the jaws is movable toward and away from the other for clamping and releasing workpieces, while shifting means are provided for the other jaw for shifting it angularly about the common axis of rotation of the jaws to move a workpiece in the chuck into predetermined machining positions and also into a loading and unloading position.

10 Claims, 9 Drawing Figures

CHUCK FOR MACHINE TOOLS

The present invention relates to a chuck for machine tools with exchangeable jaws of which at least one jaw is radially adjustable by means of an adjusting mechanism and which with chucked work pieces is adapted in a continuous manner to be shifted by a predetermined shifting angle by means of a shifting mechanism actuating at least one jaw.

Chucks of this type, which are customarily designated as shiftable chucks, are known. The shifting mechanism consists primarily of a plurality of pressure pushrods offset by a portion of the shifting angle and adapted to act upon a shifting shaft. Shiftable chucks of this type have proved very satisfactory with a great number of different machining problems inasmuch as they make possible an economic and uniformly precise machining of work pieces along a plurality of intersecting axes.

In order to adapt the above mentioned known shiftable chucks to different workpieces, it is necessary to readjust the shiftable chuck. To this end, the jaws of the shiftable chuck are easily exchangeable so that the chuck can be provided with differently shaped jaws. In this connection, the clamping jaw on the side of the shifting mechanism of the chuck determines the position or location of the workpiece with regard to the spindle axis. With heretofore known designs of the shiftable chuck, a correction of the center position with regard to the shifting axis can be effected by introducing or withdrawing shims or rings between the clamping jaw and the shifting shaft.

Such correction of the center position is possible with relatively small and light-weight workpieces. However, when large and bulky workpieces are to be machined, a fixed clamping or chucking of these workpieces in any machine position can be effected only when the connection of the clamping jaw with the shifting mechanism is free from play in any direction and is non-yieldable. The heretofore employed connection by means of cross-offsetting, which made possible the insertion of the above mentioned shims or rings, cannot bring about a connection which is play-free in every direction.

It is, therefore, an object of the present invention to provide a shiftable chuck of the above mentioned general type with exchangeable clamping jaws which will permit a connection of differently designed clamping jaws to the shifting mechanism of the chuck, which connection will be play-free and non-yieldable in any direction and which will permit a radial adjustment of the clamping jaws with regard to the shifting axis.

This object and other objects and advantages of the invention will appear more clearly from the following specification in connection with the accompanying drawings, in which.

Figure 1:
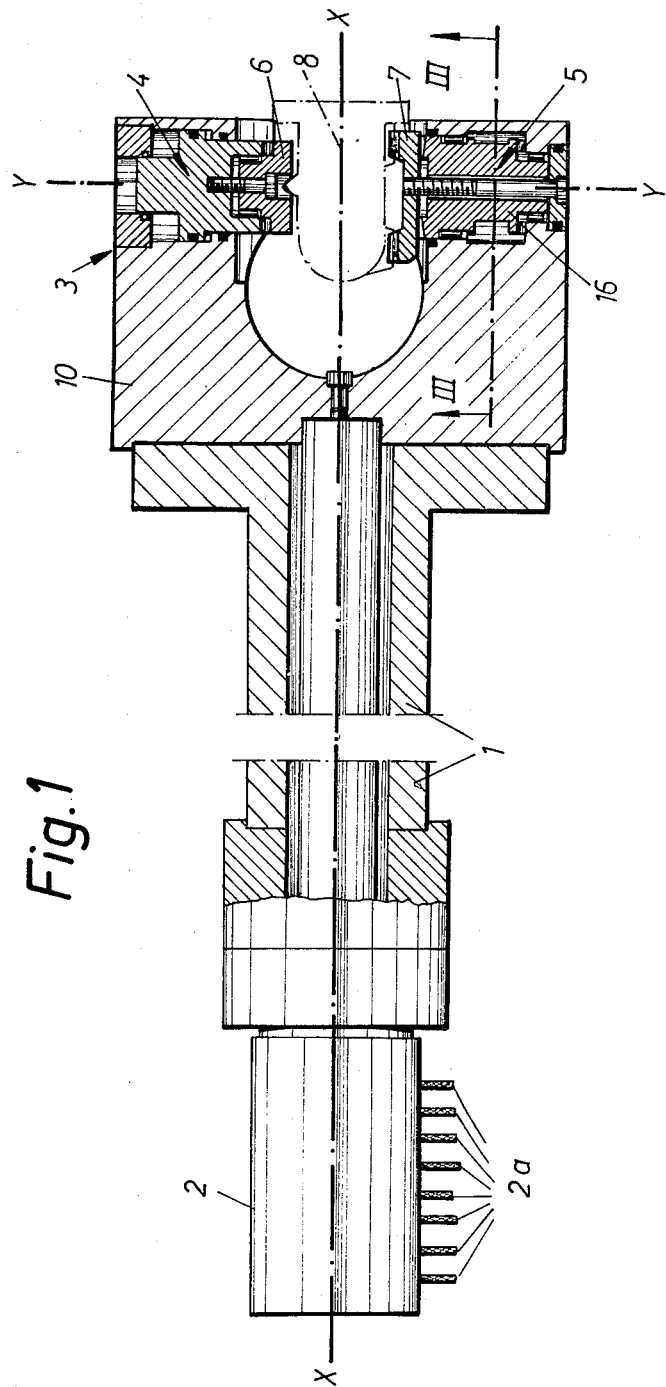
FIG. 1 illustrates partly in section and partly in view the fully assembled shiftable chuck according to the invention as connected to a spindle with oil supply.

The chuck according to the present invention is characterized primarily in that the clamping jaw which is exchangeably mounted on the shifting shaft is on all sides positively and frictionally connected, preferably by spur gear means. According to a further feature of the invention, the shifting shaft is supported in the chuck body by means of an axially adjustable supporting ring. In view of the positive connection on all sides of the clamping jaw to the shifting shaft which may be effected, for instance, by means of Hirth-type serrations, a fast exchange of different clamping jaws can be effected without affecting the precision of the connection. Although this type of connection between clamping jaw and shifting shaft excludes the employment of shims or rings, the present invention makes possible a simple and fine adjustment with regard to the correction of the height inasmuch as the shifting shaft is supported in the chuck body by means of an axial adjustable supporting ring. Such an arrangement permits a correction as to height without sacrificing rigidity.

In order to avoid the difficulties which occur in connection with the flaw-free production of a fine thread of large diameter and with precisely aligned axis, it is suggested, according to a further development of the invention, to build up the supporting ring of a base ring connected in the body of the chuck and a bearing ring and to connect these rings by a thread so that the bearing ring is rotatable from the outside. This design will make it possible to insert both interconnected rings in a stepped bore with smooth wall and to connect one ring in this bore, for instance, by cementing. The other ring is provided with suitable wrench engaging surfaces and can be turned from the outside so that a relative movement between the two rings is obtained which permits a correction as to height of the shifting side.

Many workpieces, for instance, the housings for so-called wedge slides, in addition to requiring the machining according to their main axes, also require machining according to axes which are slightly inclined by a few degrees with regard to the main axes. Thus, on housings for wedge slides it is necessary to machine the two oppositely located flanges for the pipe connections and perpendicularly thereto the flange for connection of the lid or cover in which the drive for the wedge slide is mounted. These working steps are effected along the main axes. In addition to these machining steps, it is necessary, in the interior of the wedge slide, to machine the two seats for the wedge slide the surfaces of which are by an angle of approximately 3° inclined relative to the surfaces for the two connecting flanges. For these machining operations, corresponding further control positions of the work piece are desired. With the simple shifting mechanism of heretofore known designs, such intermediate positions adjacent the main positions cannot be realized.

In order to realize such intermediate positions without increasing the diameter of the shiftable chuck, it is suggested according to a further development of the invention to arrange in the chuck body an auxiliary pushrod which is parallel to the shifting shaft and which by means of inclined engaging surfaces engages a guiding element of the clamping jaw which is offset by a small angle with regard to the normal shifting position, the said angle corresponding to the inclination of the surfaces additionally to be machined with regard to the main surfaces.

According to a further development of this feature, it is suggested for a preferred design of the invention to arrange the auxiliary pushrod on a double-acting piston and to provide said pushrod with a conical engaging surface while forming the guiding part on the clamping jaw by two bolts arranged in spaced relationship to each other. In this way a particularly simple means is obtained for the auxiliary or additional adjustment without requiring a greater number of elements or making it necessary to enlarge the chuck body.

Inasmuch as with the preferred design of the shifting mechanism with a plurality of pushrods offset by a portion of the shifting angle and acting upon a shifting shaft, the shifting operation is effected by a plurality of pushrods successively engaging the shifting shaft, the shiftable chuck according to the invention makes it possible to stop the shifting shaft in an intermediate position between two working positions.

According to a still further feature of the invention, the control of the shiftable chuck is so designed that a definite intermediate position between two working positions is obtained in which the workpiece can in an inclined position be introduced from the side between the clamping jaws and can be removed therefrom in a corresponding manner. This possibility is advantageous in particular with bulky workpieces inasmuch as in such an instance a considerable free space in front of the chuck is required. This means with heretofore known chuck constructions that all tools had to be moved back relatively far from the chuck body, and this is the reason why such machines frequently had to be longer than necessary for the working operations proper. The design according to the present invention makes such moving back of the tools superfluous because also very bulky workpieces can without difficulties from the side be introduced into the shiftable chuck.

Referring now to the drawings in detail, FIG. 1 illustrates how the shiftable chuck 3 is connected to a spindle 1 which at one end is provided with an oil supply 2. The oil supply 2 receives through oil conduits 2a the necessary oil under pressure for the chucking and stepwise shifting of the jaws of the chuck 3. FIG. 1 also shows the basic construction of the shiftable chuck 3 with a clamping mechanism 4 and a shifting mechanism 5. The clamping mechanism 4 and the shifting mechanism 5 are arranged opposite to each other in the chuck body 10 of the shiftable chuck 3 and respectively support a clamping jaw 6 and 7.

Figure 2:
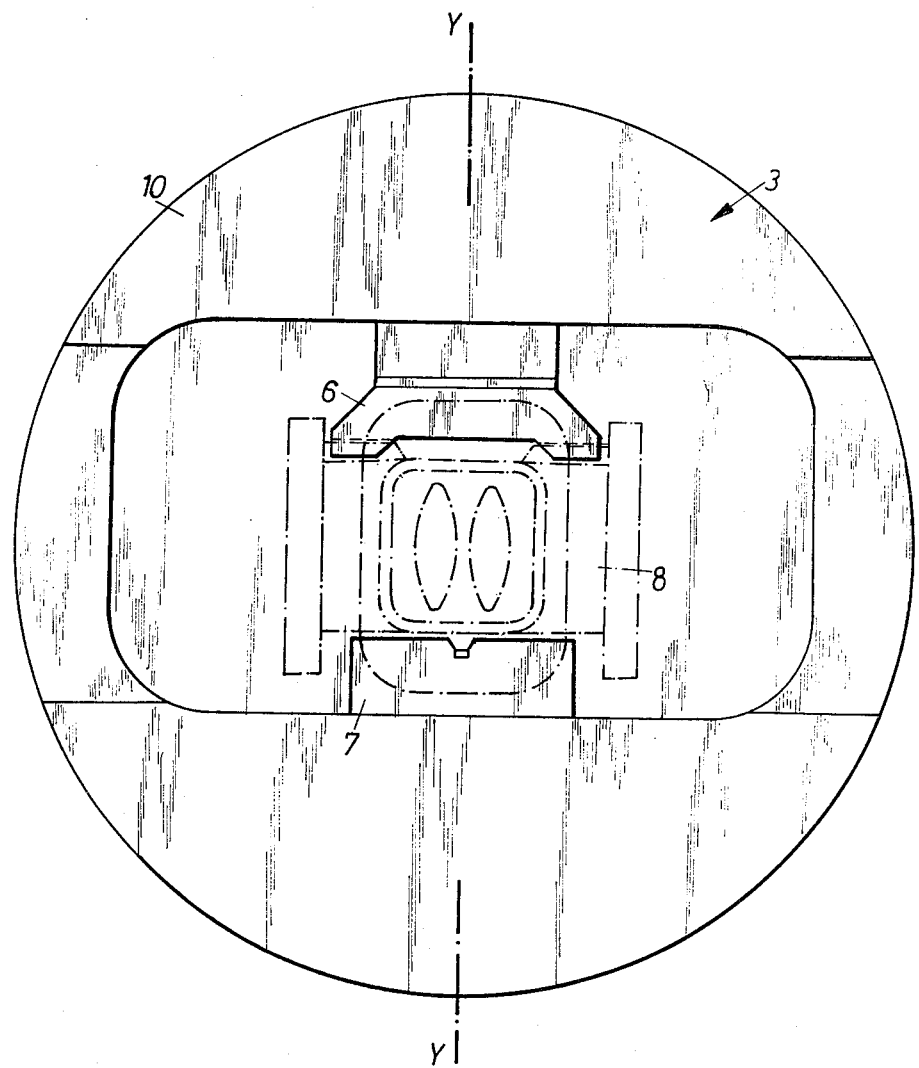
FIG. 2 is a front view of the chuck according to FIG. 1.
Figure 4:
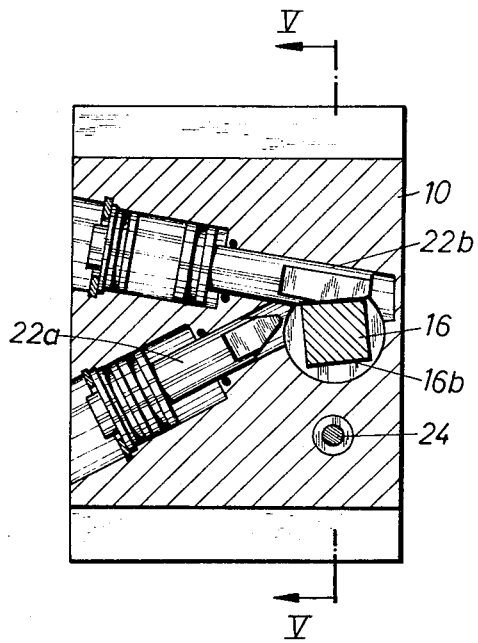
FIG. 4 shows a section similar to that of FIG. 3 in locked position after the shifting operation has been completed.
Figure 3:
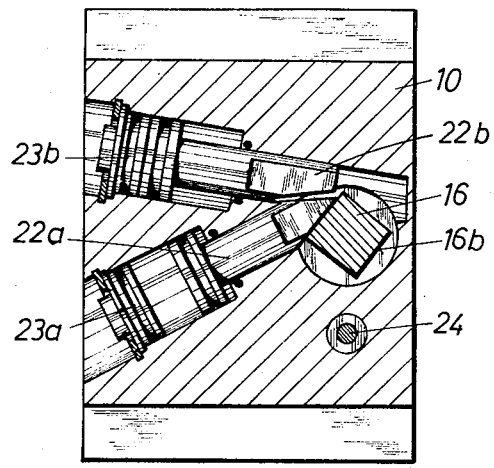
FIG. 3 represents a section taken along the line III-III of FIG. 1 through the shifting mechanism and shows the shifting mechanism during a half completed shifting operation.

The shifting axis X—X as well as the shifting axis Y—Y for a workpiece 8 chucked between the two jaws 6 and 7 are shown in FIG. 1. The design of the chuck body 10 is more clearly shown in FIG. 2 showing a front view of the chuck on an enlarged scale. FIGS. 3 and 4 indicate how the shifting mechanism 5 including a shifting shaft 16 is by means of two pushrods 22a and 22b adapted to be shifted and, more specifically, according to the embodiment shown, by 90°. The two pushrods 22a and 22b cooperate with a square-shaped section 16b of the shifting shaft 16. FIG. 3 shows the shifting shaft 16 shifted by 45° relative to its previous position. According to FIG. 4, the shifting shaft 16 has been shifted by additional 45° by means of the pushrod 22b while the pushrod 22b simultaneously brings about a locking in this position. The movement of the pushrods 22a and 22b is effected by the above mentioned oil under pressure. Both pushrods have their ends provided with piston-like enlargements which are guided in a cylinder bore of the chuck body 10 and can be acted upon from either side. In this way, a double-acting cylinder piston system is obtained which is sealed by a cover 23a and 23b respectively.

Figure 5:
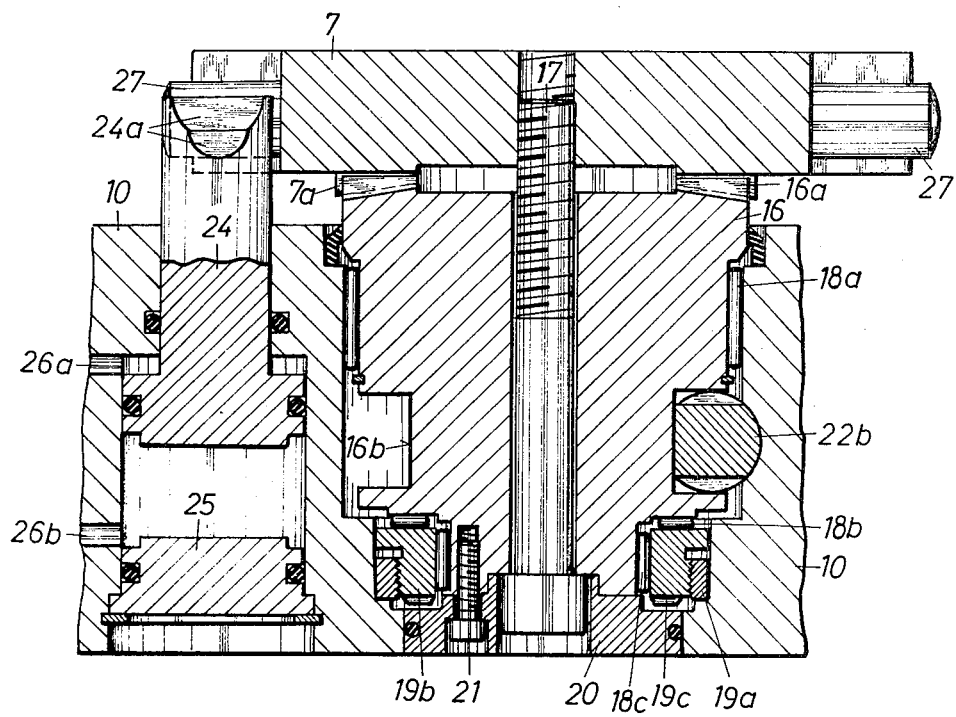
FIG. 5 represents a section through the shifting mechanism and the clamping jaw as well as the auxiliary pushrod on an enlarged scale, said section being taken along the line V—V of FIG. 3.

FIG. 5 shows on an enlarged scale the design of the shifting mechanism 5. As will be seen from FIG. 5, the shifting shaft 16 is provided with a formed-in square head section 16b adapted to be engaged by the pushrods 22a and 22b. Shaft 16 is by means of two radial bearings 18a and 18c and an axial bearing 18b journalled in the chuck body 10. As will furthermore be seen from FIG. 5, shaft 16 has that side thereof which faces the clamping jaw 7 provided with radial serrations or spur teeth 16a engaged by corresponding teeth 7a of the jaw 7. Clamping jaw 7 is by means of a connecting screw 17 held on the shaft 16. In this way, a positive connection on all sides of the exchangeable clamping jaws with the shiftable shaft 16 is obtained. An exchange of the clamping jaws is necessary whenever it is desired to adapt the chuck to the respective work piece to be chucked. In order during this adaptation simultaneously to permit a correction in radial direction, the axial bearing 18b of the shifting shaft 16 rests on a bearing ring 19b which by means of a thread is connected to a base ring 19a. Base ring 19a is inserted into a smooth-walled but stepped bore of the chuck body 10 and is connected in this bore, for instance, by cementing to thereby prevent ring 19a from turning in said bore. In order to obtain a radial adjustment, the bearing ring 19b may be turned relative to the base ring 19a to which end the bearing ring 19b is provided with surfaces 19c to be engaged by a corresponding wrench. These surfaces 19 c are accessible after a cover 20 normally connected by screws 21 to the shaft 16 has been removed.

While the clamping jaw 7 connected to the shifting mechanism 16 conveys the shifting movement to the work piece 8 and from the latter to the oppositely located clamping jaw 6, the said clamping jaw 6 which is connected to the clamping mechanism 4 carries out a clamping movement in radial direction in order to chuck the work piece 8 or release the same.

Figure 6:
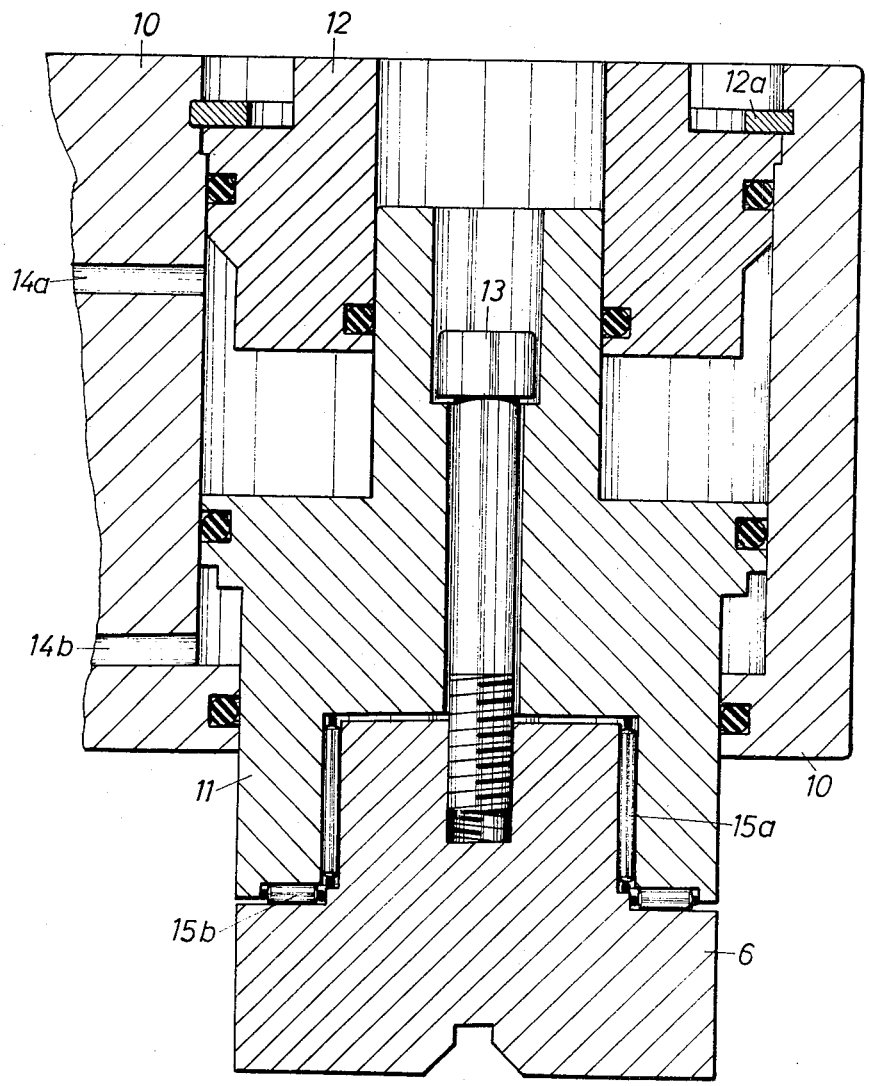
FIG. 6 is a section through the clamping mechanism according to FIG. 1.

FIG. 6 illustrates on an enlarged scale the design of the clamping mechanism 4 which comprises primarily a clamping piston 11. The clamping jaw 6 is by means of a jaw connecting screw 13 rotatably connected to the clamping piston 11 while a radial bearing 15a and an axial bearing 15b are interposed. The clamping piston 11 designed as a double-acting piston is guided in a bore of the chuck body 10 which bore at the outer circumference is closed by a cylinder cover 12. The cover 12 is held in its position by a spring ring 12a. At the left-hand upper portion of FIG. 6 there are shown the two oil passages 14a and 14b through the oil under pressure is conveyed to the cylinder chamber.

Inasmuch as by means of the two pushrods 22a and 22b, which cooperate with the square head member 16b of shaft 16, it is possible to shift the clamped-in workpiece 8 only through a structural determined large angular range which is determined by the number of the pushrods and the design of that portion of shaft 16 which cooperates with the pushrod, an additional pushrod 24 has been provided in the chuck body 10 by means of which it is possible to shift the workpiece 8 by any desired but small angular range while the shifting shaft 16 is unlocked.

Figure 7:
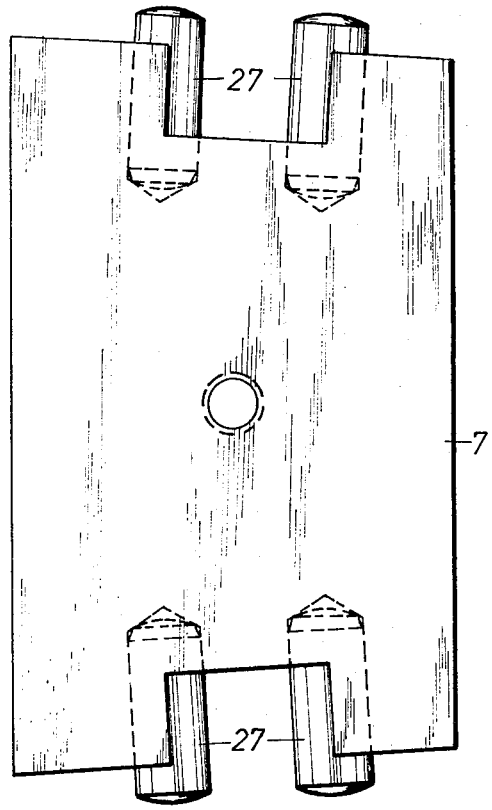
FIG. 7 shows a top view of the clamping jaw connected to the shifting shaft.

According to the illustrated embodiment, the two pushrods 22a and 22b are adapted, inasmuch as they cooperate with the square head member 16b of shaft 16, to bring about a shifting of the workpiece 8 by 90°. With this shifting angle it is made possible to machine the workpiece 8, illustrated by dot-dash lines as housing of a wedge slide, with regard to its main axes offset by 90°. Inasmuch as the seating surfaces in the interior of the housing for the wedge slide have to be machined in an inclined position, inclined for instance by 3 angular degrees relative to the main axes, the additional or auxiliary pushrod 24 provided with conical engaging surfaces 24a acts upon a guiding member which on the respective clamping jaw is designed in conformity with the desired angle. According to the illustrated embodiment, the guiding part is formed by two bolts 27 arranged in spaced relationship to each other. These bolts 27 are arranged at oppositely located ends of the clamping jaw 7 and are relative to the main axis inclined by the desired angle. This is particularly clearly shown in FIG. 7.

Figure 8:
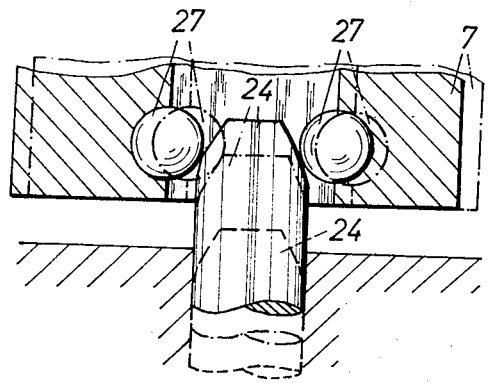
FIG. 8 represents a section through a portion of the clamping jaw and a portion of the auxiliary pushrod to illustrate the additional shifting operation.

The additional pushrod 24 has its end widened to form a piston which is guided in a cylindrical bore of the chuck body 10. According to FIG. 5, the oil passages 26a and 26b as well as the cover 25 for closing the cylindrical bore are shown. Ordinarily, i. e. when advancing the workpiece 8 by means of the shifting mechanism 5, the additional pushrod 24 occupies the dash line position of FIG. 8. The clamping jaw 7 with the nonillustrated workpiece 8 will then occupy the dot-dash line position along one of the main axes. When the clamping jaw 7 is now to be shifted about the desired small angle, both pushrods 22a and 22b are pulled back from the square head member 16b of the shifting shaft 16, and the additional pushrod 24 is removed from the chuck body 10. In the dot-dash line position shown in FIG. 8, the pushrod 24 has its surfaces 24a engage the bolt 27 which is located on the left-hand side of the drawing and pertains to the clamping jaw 7. During the further movement of the additional pushrod 24, the clamping jaw 7 is shifted into the full line position. As soon as the additional pushrod 24 has reached its end position likewise shown in full lines, the shifting movement is completed. Inasmuch as in this position the additional pushrod 24 engages the two bolts 27, a fully satisfactory locking of the workpiece 8 between the two clamping jaws 6 and 7 is obtained for the shifting position outside the main axes.

Figure 9:
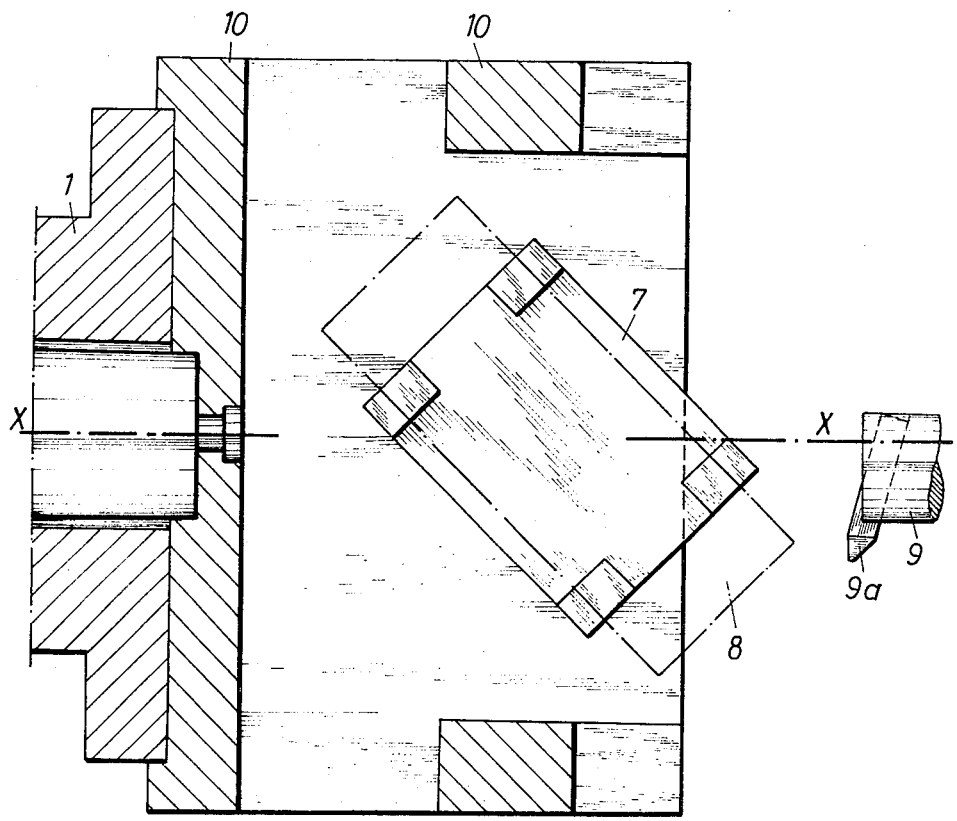
FIG. 9 is a longitudinal section through the shiftable chuck showing the clamping jaws in an intermediate position between two working positions.

FIG. 9 finally illustrates that the clamping jaws 6 and 7 can be stopped in an intermediate position between two main axes so that a particularly bulky and lengthy workpiece 8 can be withdrawn without having to withdraw the tool 9a connected to the tool holder 9 unnecessarily far from the shiftable chuck 3. In view of this feature, the time required for setting the work piece and other auxiliary time not involving the actual machining is greatly reduced while the chucking operations are greatly facilitated.

It is, of course, to be understood that the present invention is, by no means, limited to the particular showing in the drawings but also comprises any modifications within the scope of the appended claims.

What is claimed is:

1. A chuck for a machine tool having a body adapted for rotation on a work axis, workpiece engaging means carried by said body at one end on opposite sides of said work axis and adapted to receive and clamp a workpiece therebetween for rotation on said work axis, means supporting said workpiece engaging means for rotation in said body on a common axis perpendicular to and intersecting said workpiece axis, actuating means for actuating at least one of said workpiece engaging means axially along said common axis for clamping and releasing workpieces disposed between said workpiece engaging means, shifting means in said body actuatable for engaging and controllably shifting at least one of said workpiece engaging means angularly on said common axis, and at least one of said workpiece engaging means comprising face tooth means and a clamping jaw nonrotatively mounted interchangeably thereon at the workpiece and thereof and means to operatively engage and precisely locate said shaft and clamping jaw in at least one predetermined angular position thereof on said common axis corresponding to a workpiece machining position.

2. A chuck according to claim 1, in which one only of said workpiece engaging means is axially movable on said common axis and the other of the said workpiece engaging means is angularly shiftable on said common axis, said other of said workpiece engaging means comprising a pivot shaft located on said common axis and having an axial portion formed with circumferentially distributed flats disposed angularly to each other, said shifting means comprising angularly related shifting plungers reciprocable in said body at an angle to said common axis and having end parts adapted to engage said flats and thereby rotate said shaft to predetermined angular positions in said body, said clamping jaw being fastened nonrotatively as connected to the workpiece and of said pivot shaft and being adapted for nonrotative engagement with a workpiece.

3. A chuck for a machine tool having a body adapted for rotation on a work axis, workpiece engaging means carried by said body at one end on opposite sides of said work axis and adapted to receive and clamp a workpiece therebetween for rotation on said work axis, means supporting said workpiece engaging means for rotation in said body on a common axis perpendicular to and intersecting said workpiece axis, actuating means for actuating at least one of said workpiece engaging means axially along said common axis for clamping and releasing workpieces disposed between said workpiece engaging means, shifting means in said body actuatable for engaging and controllably shifting at least one of said workpiece engaging means angularly on said common axis, and at least one of said workpiece engaging means comprising a clamping jaw nonrotatively mounted thereon at the workpiece end thereof, one only of said workpiece engaging means being axially movable on said common axis and the other of the said workpiece engaging means being angularly shiftable on said common axis, said other of said workpiece engaging means comprising a shaft located on said common axis and having an axial portion formed with circumferentially distributed flats disposed angularly to each other, said shifting means comprising angularly related shifting plungers reciprocable in said body at an angle to said common axis and having end parts adapted to engage said flats and thereby rotate said shaft to predetermined angular positions in said body, said clamping jaw being norotatively connected to the workpiece end of said shaft and being adapted for nonrotative engagement with a workpiece, and a further plunger reciprocable in said body in a direction generally parallel to said common axis and having an end part adapted operatively to engage and precisely locate said shaft and clamping jaw in at least one predetermined angular position thereof on said common axis corresponding to a workpiece machining position.

4. A chuck for a machine tool having a body adapted for rotation on a work axis, workpiece engaging means carried by said body at one end on opposite sides of said work axis and adapted to receive and clamp a workpiece therebetween for rotation on said work axis, means supporting said workpiece engaging means for rotation in said body on a common axis perpendicular to and intersecting said workpiece axis, actuating means for actuating at least one of said workpiece engaging means axially along said common axis for clamping and releasing workpieces disposed between said workpiece engaging means, shifting means in said body actuatable for engaging and controllably shifting at least one of said workpiece engaging means angularly on said common axis, and at least one of said workpiece engaging means comprising a clamping jaw nonrotatively mounted thereon at the workpiece end thereof, one only of said workpiece engaging means being axially movable on said common axis and the other of the said workpiece engaging means being angularly shiftable on said common axis, said other of said workpiece engaging means comprising a shaft located on said common axis and having an axial portion formed with circumferentially distributed flats disposed angularly to each other, said shifting means comprising angularly related shifting plungers reciprocable in said body at an angle to said common axis and having end parts adapted to engage said flats and thereby rotate said shaft to predetermined angular positions in said body, said clamping jaw being nonrotatively connected to the workpiece end of said shaft and being adapted for nonrotative engagement with a workpiece, and said body having a bore receiving said shaft, radial and axial bearing means in said bore between the shaft and body rotatably supporting the shaft in the body, and elements of relatively adjustable abutment means between said axial bearing means and said body for adjustment of the axial position of said shaft for clamping jaw thereon on said common axis.

5. A chuck according to claim 4, in which said shaft together with said bearing means and the element of said abutment means pertaining to said axial bearing means is insertable into and removable from the workpiece end of said bore as a unit upon retraction of said shifting plunger away from said shaft.

6. A chuck according to claim 4, in which at least one of said elements of abutment means is accessible from the outside of said body for adjustment of said abutment means thereby to permit radial adjustment of the clamped position of a workpiece clamped in said chuck.

7. A chuck according to claim 6, in which said one of said elements is in the form of a bearing ring engaging said axial bearing means on the side thereof opposite the side which engages said shaft, a base ring threaded on said bearing ring for axial adjustment thereon upon relative rotation of said rings, and a shoulder in said bore engaging said base ring.

8. A chuck according to claim 3, in which said clamping jaw on said shaft includes means for engagement by said end part of said further plunger for angularly locating said shaft and jaw in at least one precise angular position on said common axis corresponding to a machining position of a workpiece in said chuck, the said shifting plungers being operable to shift said shaft and clamping jaw to an angular position displaced slightly from said precise angular position.

9. A chuck according to claim 8, which includes a double acting piston connected to said further plunger and a bore in said body receiving said piston, said end part of said plunger being conical, and said means on said clamping jaw comprising at least two circumferentially spaced pairs of circumferentially spaced stud members, each pair of stud members being adapted to receive said conical end part of said further plunger therebetween to determine a respective rotated workpiece machining position of said shaft and clamping jaw.

10. A chuck according to claim 3, which includes means for actuating said shifting plungers alternately thereby to move said shaft and clamping jaw into a plurality of rotated positions, at least one of said rotated positions being disposed at an angle to a said workpiece machining position and with said clamping jaw located for easy insertion of a workpiece into the chuck and easy removal of a workpiece from the chuck.

* * * * *